US006662175B1

United States Patent
Ghazal et al.

(10) Patent No.: US 6,662,175 B1
(45) Date of Patent: Dec. 9, 2003

(54) SEMANTIC QUERY OPTIMIZATION USING VALUE CORRELATION

(75) Inventors: Ahmad Said Ghazal, Redondo Beach, CA (US); Paul Laurence Sinclair, Manhattan Beach, CA (US)

(73) Assignee: NCR Corporation, Dayton, OH (US)

( * ) Notice: Subject to any disclaimer, the term of this patent is extended or adjusted under 35 U.S.C. 154(b) by 357 days.

(21) Appl. No.: 09/850,765

(22) Filed: May 8, 2001

(51) Int. Cl.$^7$ .............................................. G06F 17/30

(52) U.S. Cl. ............................................ 707/2; 707/10

(58) Field of Search ................................ 707/1, 2, 3, 4, 707/10

(56) References Cited

U.S. PATENT DOCUMENTS

| | | | | |
|---|---|---|---|---|
| 5,899,993 A | * | 5/1999 | Jenkins, Jr. ..................... | 707/9 |
| 6,272,487 B1 | * | 8/2001 | Beavin et al. .................. | 707/2 |
| 6,453,314 B1 | * | 9/2002 | Chan et al. ..................... | 707/3 |
| 6,460,043 B1 | * | 10/2002 | Tabbara et al. ............. | 707/100 |
| 2002/0083049 A1 | * | 6/2002 | Forster et al. .................. | 707/3 |

OTHER PUBLICATIONS

Chun–Nan Hsu, et al., Using Inductive Learning To Generate Rules For Semantic Query Optimization, Advances of Knowledge Discovery and Data Mining, AAAI Press, 1995, pp. 201–218.

Sreekumar T. Shenoy, et al., A System for Semantic Query Optimization, Case Western Reserve University, Cleveland, Ohio 44106, pp. 181–195.

Alon Y. Levy, et al., Semantic Query Optimization in Datalog Programs, (Extended Abstract), pp. 163–173.

Laks V.S. Lakshmanan, et al., Structural Query Optimization—A Uniform Framework For Semantic Query Optimization In Deductive Databases, pp. 102–114.

Qi Cheng, et al., Implementation of Two Semantic Query Optimization Techniques in DB2 Universal Database, Proceedings of the 25th VLDB Conference, Edinburgh, Scotland, 1999, pp. 687–698.

TPC Benchmark (TM) H, Transaction Processing Performance Council (TPC), San Jose, CA 95112–6311, pp. 1–151.

U. Chakravarty, J. J. Grant and J. Minker, Logic Based Approach to Semantic Query Optimization, ACM Transactions on Database Systems, Jun. 1990, pp. 162–207, vol. 15, No. 2.

J. J. King, Quist: A System for Semantic Query Optimization in Relational Databases, Proceedings of the Seventh International Conference on Very Large Databases, Sep. 1981, pp. 510–517.

(List continued on next page.)

Primary Examiner—Jack M. Choules
(74) Attorney, Agent, or Firm—Baker Botts LLP

(57) ABSTRACT

A method and computer system for optimizing queries to a database are disclosed. The database includes a first table (T1) having a primary key (PK) column and a first correlated value column ($CV_1$) and a second table (T2) having a foreign key (FK) column related to the primary key column of the first table and a second correlated value column ($CV_2$). The method includes joining T1 to the T2 using PK=FK as the join condition to produce a join result having rows. Each row includes a value from $CV_1$ and a value from $CV_2$. The method further includes creating an initial running constraint (RC). The initial running constraint includes a null range. The method further includes producing a derived constraint rule (DCR) having the following form:

$$(PK=FK) \rightarrow CV_2 + C_1 \leq CV_1 \leq CV_2 + C_2$$

where $C_1$ and $C_2$ are constants, and "$\rightarrow$" means "implies," by performing the following processing for each row in the join result: computing a new constraint (NEW), having a range, and modifying RC by merging the range of NEW with the range of RC.

22 Claims, 7 Drawing Sheets

OTHER PUBLICATIONS

H. Pirahesh, J.M. Hellerstein and W. Hasan, Extensible/Rule Based Query Rewrite Optimization in Starburst, ACM Sigmod Record, 1992, pp. 39–48, San Jose, CA 95120.

M. Siegel, E. Sciore and S. Salveter, A Method for Automatic Rule Derivation to Support Sematic Query Optimization, Dec. 1992, pp. 563–600, ACM Transactions on Database Systems, vol. 17, No. 4.

S. Chaudhuri, An Overviw of Query Optimization in Relational Systems, Proceedings of the Seventeenth ACM SIGACT–SIGMOD–SIGART Symposium on Principles on Database Systems, ACM, 1998, pp. 34–43, Seattle, WA 98052.

M. Jarke and J. Koch, Query Optimization in Database Systems, Jun. 1984, pp. 111–152, Computing Surveys, vol. 16, No. 2.

I. S. Mumick, S. J. Finkelstein, H. Pirahesh, and R. Ramakrishnan, Magic Conditions, Mar. 1996, pp. 107–155, ACM Transactions on Database Systems, vol. 21, No. 1.

I. S. Mumick, S. J. Finkelstein, H. Pirahesh, and R. Ramakrishnan, Magic is Relevant, Jun. 1990, pp. 247–258, Sigmod Record, vol. 19, No. 2 (Proceedings on the ACM Sigmod International Conference on Management of Data, 1990).

W. P. Yan and P. A. Larson, Performing Group–By Before Join, Feb. 1994, pp. 89–100, IEEE International Conference on Data Engineering.

G. D. Xu, Search Control in Semantic Query Optimization, pp. 1–48, TR# 83–09, Computer and Information Science, University of Massachusetts at Amherst, Amherst, MA 01003.

J. Gryz, L. Liu and X Qian, Semantic Query Optimization in IBM DB2: Initial Results, Technical Report CS–1999–01, Feb. 19, 1999, pp. 1–20, Department of Computer Science, York University, Toronto, Canada.

M. T. Hammer and S. B. Zdonik, Knowledge–Based Query Processing, Oct. 1980, pp. 137–147, Cambridge, MA 02139.

M. Jarke, J. Clifford and Y. Vassiliou, An Optimizing Prolog Front–End to a Relational Query System, Jun. 1984, pp. 286–306, Sigmod Record, vol. 14, No. 2.

A. Y. Levy, I. Mumick and Y. Sagiv, Query Optimization by Predicate Move–Around, 1994, pp. 96–108, Proceedings of the 20th VLDB Conference, Santiago, Chile.

H. Pirahesh, T. Y. Cliff Leung and W. Hasan, A Rule Engine for Query Transformation in Starburst and IBM DB2 C/S DBMS, 1997, pp. 391–400.

S. Shekhar, J. Srivastava and S. Dutta, A Formal Model of Trade–Off Between Optimization and Execution Costs in Semantic Query Optimization, 1988, pp. 457–467, Proceedings of the 14th VLDB Conference, Los Angeles, California.

S. T. Shenoy and Z. M. Ozsoyoglu, Design and Implementation of a Semantic Query Optimizer, Sep. 1989, pp. 344–361, IEEE Transactions on Knowledge and Data Engineering, vol. 1, No. 3.

* cited by examiner

T2

| PRIMARY KEY | $DATE_1$ |
|---|---|
| 1 | 01/01/00 |
| 2 | 01/10/00 |
| 3 | 01/11/00 |
| 4 | 01/15/00 |

| FOREIGN KEY | $DATE_2$ |
|---|---|
| 1 | 01/20/00 |
| 2 | 01/25/00 |
| 3 | 01/27/00 |
| 4 | 02/05/00 |

FIG. 6
JOIN RESULT
| $D_2$ | $D_1$ | $D_1$-$D_2$ |
|---|---|---|
| 01/01/00 | 01/20/00 | 19 |
| 01/10/00 | 01/25/00 | 14 |
| 01/11/00 | 01/27/00 | 15 |
| 01/15/00 | 02/05/00 | 21 |
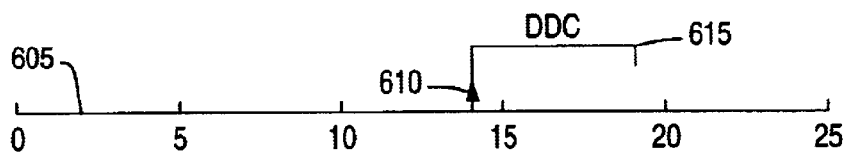
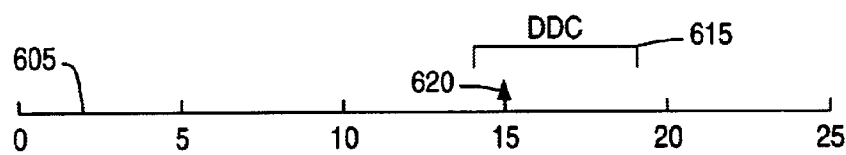
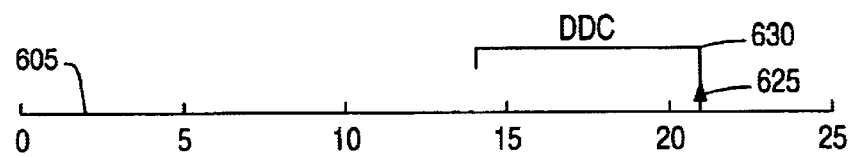
FINAL C1 = 14       FINAL DDCR
FINAL C2 = 21    (PK = FK) → $DATE_2 + 14 \leq DATE_1 \leq DATE_2 + 21$

SEMANTIC QUERY OPTIMIZATION USING VALUE CORRELATION

BACKGROUND

Query optimization is important in relational database systems that deal with complex queries against large volumes of data. Unlike earlier navigational databases, a query on a relational database specifies what data is to be retrieved from the database but not how to retrieve it. Optimizing a query against a relational database is not as important in transaction-oriented databases where only a few rows are accessed either because the query is well specified by virtue of the application or because the query causes the data to be accessed using a highly selective index. In decision support and data mining applications, where the space of possible solutions is large and the penalty for selecting a bad query is high, optimizing a query to reduce overall resource utilization can provide orders of magnitude of overall performance improvement.

One existing query optimization technique is to rewrite the user-specified query. The query is transformed into a logically equivalent query that costs less, i.e. requires less time, to execute. The existing techniques for query transformation include syntactic and semantic techniques. Syntactic or algebraic transformations use the properties of the query operators and their mapping to rewrite the query. Some forms of magic set transformation, most forms of predicate push down, and transitive closures are techniques that fall under this category. Semantic query transformations use declarative structural constraints and the semantics of an application's specific knowledge, declared as part of the database, to rewrite the query. Semantic query transformation based rewrites are called semantic query optimization or SQO.

The basic purpose of a query rewrite is to reduce the number of rows processed during the query. Existing techniques for query rewrite are focused primarily on structural constraints of the database and knowledge of the domain of the database. For example, structural constraint based semantic optimizations use functional dependencies, key dependencies, value constraints, and referential constraints that are defined on relations in the database. Other existing query optimizers use constraints called implication integrity constraints and subset integrity constrains.

SUMMARY

In general, in one aspect, the invention features a method for optimizing queries to a database. The database includes a first table (T1) having a primary key (PK) column and a first correlated value column ($CV_1$) and a second table (T2) having a foreign key (FK) column related to the primary key column of the first table and a second correlated value column ($CV_2$). The method includes joining T1 to the T2 using PK=FK as the join condition to produce a join result having rows. Each row includes a value from $CV_1$ and a value from $CV_2$. The method further includes creating an initial running constraint (RC). The initial running constraint includes a null range. The method further includes producing a derived constraint rule (DCR) having the following form:

$$(PK=FK) \rightarrow CV_2 + C_1 \leq CV_1 \leq CV_2 + C_2$$

where $C_1$ and $C_2$ are constants, and "→" means "implies," by performing the following processing for each row in the join result: computing a new constraint (NEW), having a range, and modifying RC by merging the range of NEW with the range of RC.

Implementations of the invention may include one or more of the following. The join result produced by joining may include a virtual join result. Creating the initial RC may include applying the following equation:

$$CV_2 + C_1 \leq CV_1 \leq CV_2 + C_2$$

$$C_1 = C_2.$$

Computing a new constraint may include solving for $C_1$ and $C_2$ in the following equation:

$$CV_2 + C_1 \leq CV_1 \leq CV_2 + C_2;$$

where $CV_1$ and $CV_1$ are from the same row in the join result. The range of RC may be specified by the following equation:

$$CV_2 + C_1 \leq CV_1 \leq CV_2 + C_2$$

and modifying RC may include adjusting C1 and C2 so that the range of the modified RC covers the range of the unmodified RC and the range of NEW.

The method may further include determining the usefulness of the DCR. Determining the usefulness of the DCR may include comparing the range of the DCR to the range of one of $CV_1$ or $CV_2$. Determining the usefulness of the DCR may include computing usefulness using the following equation:

$$\text{usefulness} = \frac{C_1 - C_2}{\text{SIZE}}$$

where SIZE is the range of one of $CV_1$ or $CV_2$. The method may further include discarding the DCR if its usefulness is greater than a threshold.

The method may further include maintaining the DCR in view of changes to T1 or T2. Maintaining may include doing nothing if a row is inserted in T1. Maintaining may include doing nothing if a column other than PK, FK, $CV_1$, or $CV_2$ is updated in T1 or T2. Maintaining may include doing nothing if a row is deleted from either T1 or T2. Maintaining may include recomputing the DCR after a predetermined number of rows have been deleted from T1 or T2. Maintaining may include joining a new row added to T2 with T1, finding the constraint associated with the new row, and merging the new constraint with the DCR to form a new DCR.

The method may include storing the DCR and applying the right-hand side of the DCR to a query if the left hand side of the DCR is present in a conjunction in the query and at least one of CV, or $CV_2$ is referenced in the conjunction.

$CV_1$ and $CV_2$ may be date columns.

In general, in another aspect, the invention features a method for optimizing queries to a database. The database includes a first table (T1) having a primary key (PK) column and a first correlated value column ($CV_1$) and a second table (T2) having a foreign key (FK) column related to the primary key column of the first table and a second correlated value column ($CV_2$). The method includes joining T1 to the T2 using PK=FK as the join condition to produce a join result having rows. Each row includes a value from $CV_1$ and a value from $CV_2$. The method further includes creating an initial running constraint (RC). The initial running constraint includes a null range. The method includes producing a derived constraint rule (DCR) having the following form:

$$(PK = FK) \rightarrow (CV_2 + C_{1A} \leq CV_1 \leq CV_2 + C_{2A}) \cup$$
$$(CV_2 + C_{1B} \leq CV_1 \leq CV_2 + C_{2B}) \cup$$
$$...$$
$$(CV_2 + C_{1N} \leq CV_1 \leq CV_2 + C_{2N});$$

where $C_{1A}$, $C_{2A}$, $C_{1B}$, $C_{2B}$, ... $C_{1N}$ and $C_{2N}$ are constants, "→" means "implies," and each parenthesized term on the right-hand side of the above equation represents an interval, by performing the following processing for each row in the join result: computing a new constraint (NEW), having a range, and modifying RC by forming a union of the range of NEW with the range of RC.

Implementations of the invention may include one or more of the following. The method may include merging two intervals if the number of intervals N exceeds a predetermined maximum number of intervals, K. Merging two intervals may include merging the two intervals that are closest to each other.

The method may include computing the usefulness of the DCR using the following equation:

$$\text{usefulness} = \frac{C_{1A} - C_{2A}}{\text{SIZE}} + \frac{C_{1B} - C_{2B}}{\text{SIZE}} + ... + \frac{C_{1N} - C_{2N}}{\text{SIZE}}$$

where SIZE is the range of one of $CV_1$ or $CV_2$.

In general, in another aspect, the invention features a computer program, stored on a tangible storage medium, for use in optimizing queries to a database. The database includes a first table (T1) having a primary key (PK) column and a first correlated value column ($CV_1$) and a second table (T2) having a foreign key (FK) column related to the primary key column of the first table and a second correlated value column ($CV_2$). The program includes executable instructions that cause a computer to join T1 to the T2 using PK=FK as the join condition to produce a join result having rows. Each row includes a value from $CV_1$ and a value from $CV_2$. The program further includes executable instructions that cause a computer to create an initial running constraint (RC), the initial running constraint comprising a null range. The program further includes executable instructions that cause a computer to produce a derived constraint rule (DCR) having the following form:

$$(PK=FK) \rightarrow CV_2+C_1 \leq CV_1 \leq CV_2+C_2$$

where $C_1$ and $C_2$ are constants, and "→" means "implies," by performing the following processing for each row in the join result: compute a new constraint (NEW), having a range, and modify RC by merging the range of NEW with the range of RC.

Other features and advantages will become apparent from the description and claims that follow.

BRIEF DESCRIPTION OF THE DRAWINGS

FIG. 5 illustrates example tables to which the algorithm is applied.

FIG. 6 illustrates the application of the algorithm to the example tables shown in FIG. 5.

DETAILED DESCRIPTION

Figure 1:
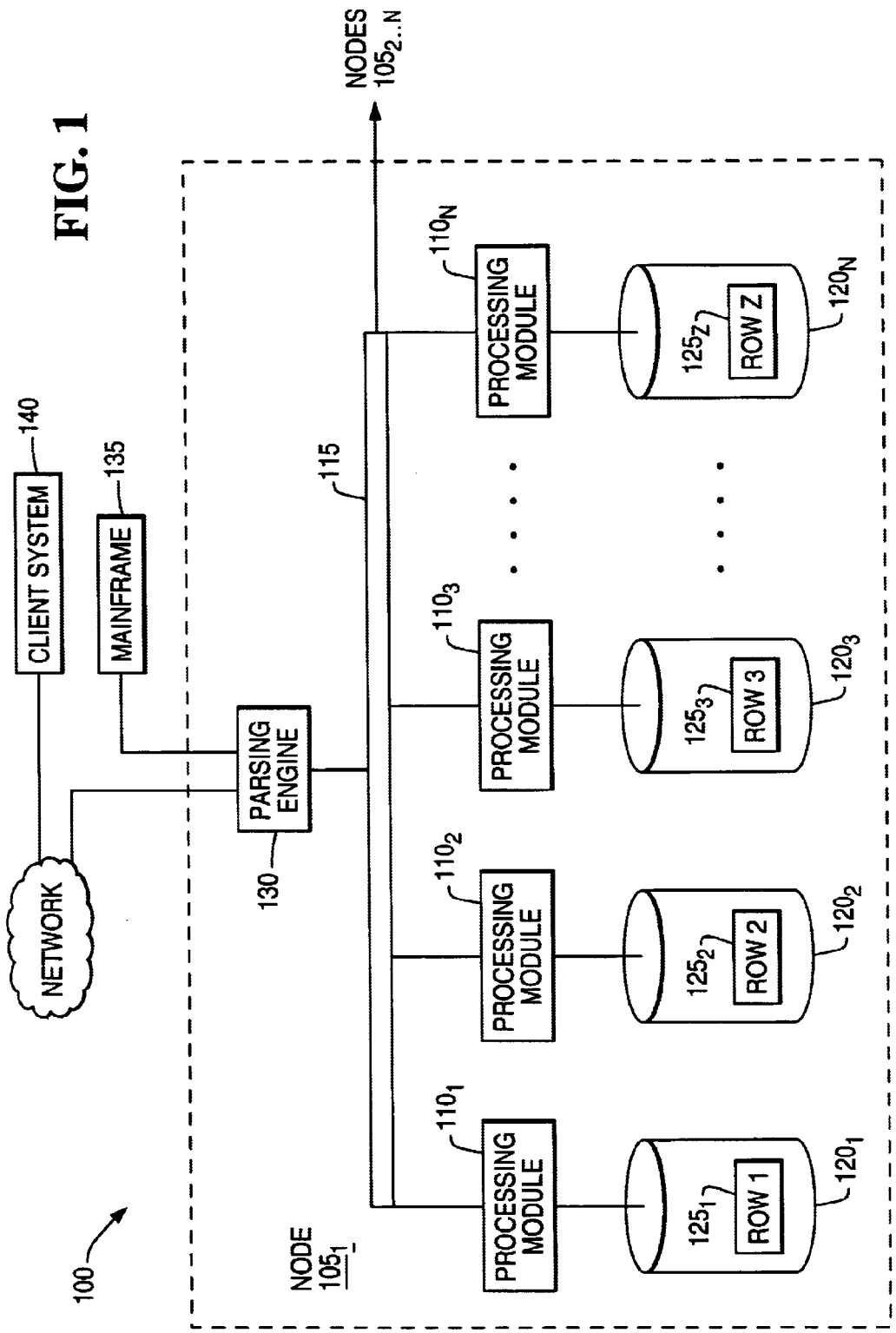
FIG. 1 is a block diagram of a node of a database system.

The query optimization technique disclosed herein has particular application to large databases which might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on a M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...N}$ in addition to the illustrated node 1051, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries in a standard format, such as SQL.

Figure 2:
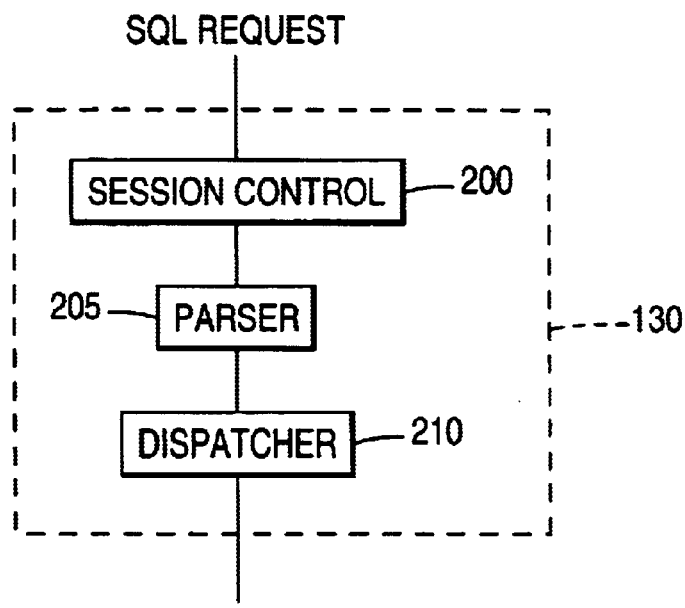
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
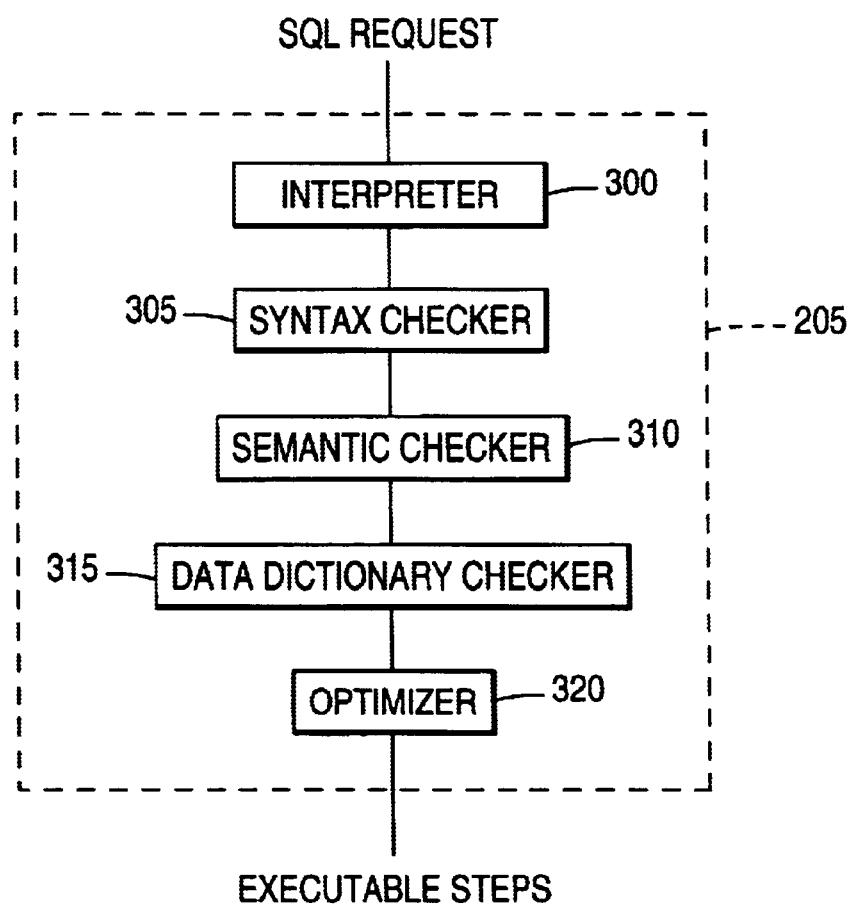
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

The optimizer (block 320) includes an algorithm to derive a constraint on a first date column in a first table based on a constraint on a second date column in a second table where there is a relation between the first date column and the second date column. The TPC-H benchmark, which is used to measure the speed and effectiveness of database queries, and which is defined in the TPC Benchamark™ H (Decision Support) Standard Specification, Revision 1.2.1 (which may be found at www.tpc.org/tpch/spec/tpch_current.pdf) provides a useful example of the application of such an algorithm. The TPC-H benchmark includes two tables: LINEITEM and ORDERS. The ORDERS table gives details about each order. The LINEITEM table gives information about each item in the order. An order may include up to 7 items. O_ORDERDATE is an attribute of the ORDERS table representing the date the order was made. L_SHIPDATE is an attribute of the LINEITEM table representing the date that line item was shipped. The LINEITEM and Order tables have a PK-FK referential integrity structural constraint based on O_ORDERKEY= L_ORDERKEY. O_ORDERKEY is the primary key ("PK") of ORDERS and L_ORDERKEY is a foreign key ("FK") for LINEITEM. Either or both or the primary key or the foreign key could include multiple columns. It is assumed, without loss of generality, that each is a single column.

In the TPC-H benchmark, line items of an order are shipped within 122 days of the order date. This fact can be written using the following rule (where "→" means "implies")

$$(L\_ORDERKEY=O\_ORDERKEY) \rightarrow (O\_ORDERDATE+1 \leq L\_SHIPDATE) \text{ and } (L\_SHIPDATE \leq O\_ORDERDATE+122)$$

The following query (Q3 in TPC-H) is a good example of how useful such rules can be:

```
SELECT
    L_ORDERKEY,
    SUM (L_EXTENDEDPRICE* (1-L_DISCOUNT)
    (NAMED REVENUE),  O_ORDERDATE,
    O_SHIPPRIORITY
FROM CUSTOMER, ORDERS, LINEITEM
WHERE
    C_MKTSEGMENT = 'BUILDING'
    AND  C_CUSTKEY = O_CUSTKEY
    AND  L_ORDERKEY = O_ORDERKEY
    AND  O_ORDERDATE < '1995-03-15'
    AND  L_SHIPDATE > '1995-03-15'
GROUP BY L_ORDERKEY, O_ORDERDATE, O_SHIPPRIORITY
ORDER BY REVENUE DESC, O_ORDERDATE;
```

The query has the condition (L_ORDERKEY =O_ORDERKEY) and, using the rule $$(L\_ORDERKEY=O\_ORDERKEY) \rightarrow (O\_ORDERDATE+122 \geq L\_SHIPDATE \text{ and } L\_SHIPDATE \geq O\_ORDERDATE+1),$$

the optimizer will add (ORDERDATE+122≥L_ORDERDATE and L_ORDERDATE≥O_ORDERDATE+1)

to the where clause of the query. In another phase of the optimizer, the transitive closure of the where-clause conditions are computed and the following range conditions on L_SHIDATE and O_ORDERDATE, that are specific to this query, are found: L_SHIPDATE<'1995-06-15' and O_ORDERDATE>'1994-12-15'. Together with O_ORDERDATE<'1995-03-15' AND L_SHIPDATE>'1995-03-15', O_ORDERDATE has a range of three months and L_SHIPDATE is a seven month range.

The new date constraints could be very useful in one or both of the following situations:

They could provide a fast access path to the corresponding table. For example, in Example 1, if ORDERS or one its secondary indexes are value ordered by O_ORDERDATE, only 3 months of data needs to be accessed for ORDERS.

The new constraints could reduce the size of an intermediate result. Note that this is true even if the derived constraints do not provide an access path to the table. For example, assume that ORDERS and CUSTOMER tables are hash distributed on O_ORDERKEY and C_CUSTKEY respectively. Also, assume that in the final execution plan of the query in Example 1, ORDERS will re-hashed (or "re-distributed" in terminology used by NCR Teradata) on O_CUSTKEY to join with CUSTOMER. In this case, the new constraint O_ORDERDATE>'1994-12-15' could be applied prior to the re-hashing step which will significantly reduce the amount of data that will re-hashed, sorted and stored on disk.

As just illustrated, this technique produces beneficial results when deriving date constraint rules. A more general semantic query optimization tool automatically derives constraint rules for correlated variables. A "Derived Constraints Rule" will be referred to as a "DCR" and the right hand side of a DCR as a "Derived Constraint" or "DC."

The semantic query optimization tool finds a DCR between correlated columns in PK-FK tables. In one non-limiting example, the two correlated columns are date columns. For example, in the TPC-H benchmark, the O_ORDERDATE L_SHIPDATE variables are correlated. It will be understood that the semantic query optimization tool is not limited to optimizing queries where the correlation is between date columns. The tool will work in any situation where columns in two tables having a PK-FK relationship are correlated. Henceforth, the disclosure will be focused on date constraints, although it will be understood that whenever a DDCR or a DDC is discussed, the discussion generally will apply to a DCR or DC, respectively.

A DDCR can typically be represented by the following equation:

$$(PK=FK) \rightarrow (Date_2+C_1 \leq Date_1 \leq Date_2+C_2),$$

where $C_1$, $C_2$ are constants and $Date_1$ and $Date_2$ are date columns in the PK and FK tables, respectively.

In one example, the optimizer initiates the DDCR derivation process when a user issues a collect statistic statements on a date column, e.g., $Date_1$, of a table that is either a PK or an FK table and the related table also has a date column, e.g., $Date_2$. The purpose of the algorithm is to derive the values of $C_1$ and $C_2$ in the equation above.

Figure 4:
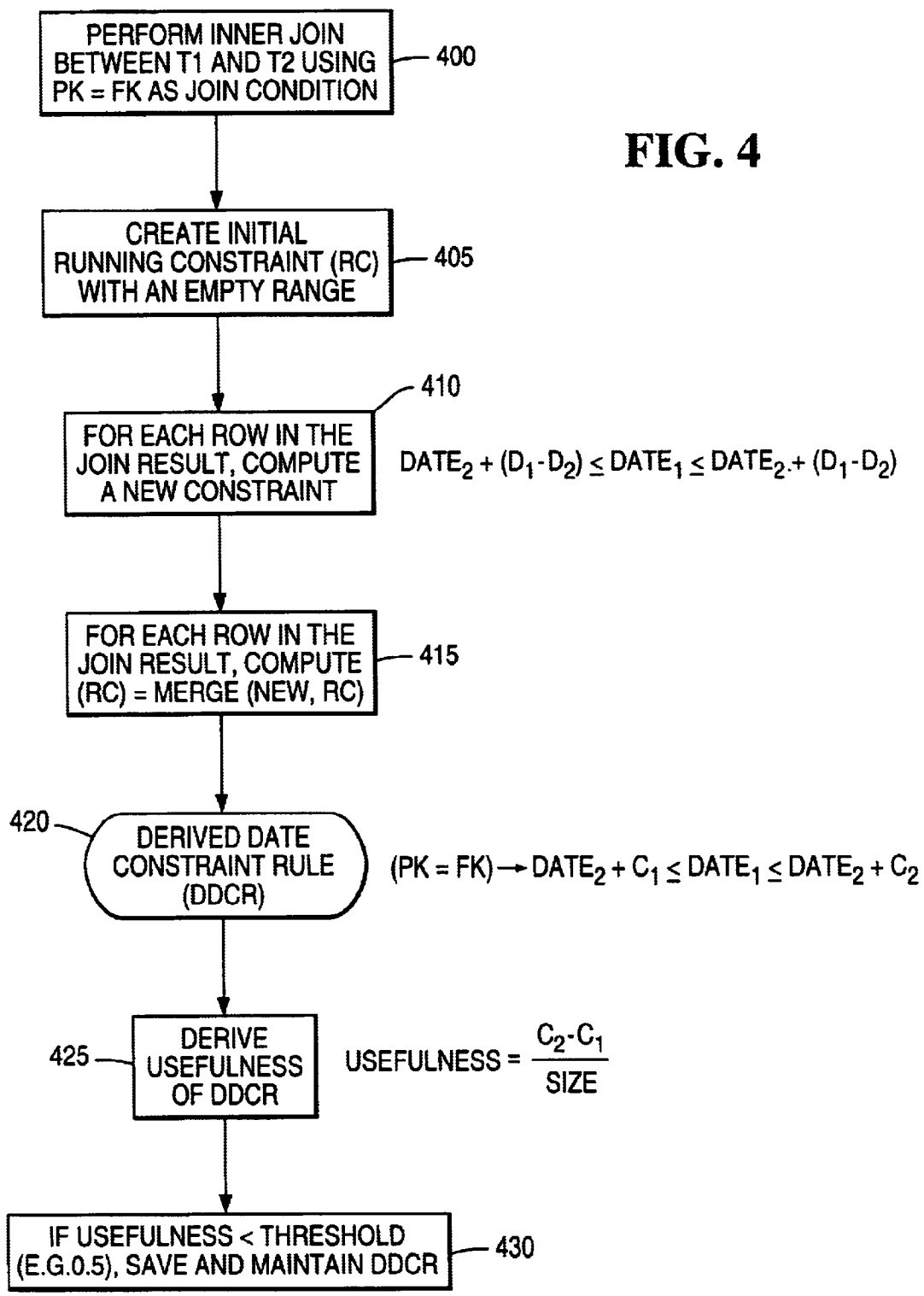
FIG. 4 is a flow chart of an algorithm for deriving and applying a Derived Date Constraint Rule.

The algorithm, illustrated in FIG. 4, assumes that $T_1$ and $T_2$ are PK-FK tables where $Date_1$ and $Date_2$ are date columns in the PK and FK tables, respectively. It is also assumed, without loss of generality, that both $Date_1$ and $Date_2$ are not nullable.

The process begins by performing an inner join between $T_1$ and $T_2$ using PK=FK as a join condition (block 400). The optimizer will choose the optimal join method. It is not necessary to write the join results to a spool, since the constraint between the two dates will be derived on the fly.

The algorithm next creates an initial constraint: $Date_2 + C_1 \leq Date_1 \leq Date_2 + C_2$ where $C_1 = C_2$ (block 405). This constraint is true regardless of the values of $Date_1$ or $Date_2$, and is referred to as the initial "running constraint" (RC).

For each row in the join result, the algorithm computes a new constraint (block 410). To compute this new constraint, the values for $Date_1$ and $Date_2$ in $T_1$ and $T_2$, respectively, are $D_1$ and $D_2$, respectively, in the row being analyzed in the join result. Using these values, the constraint $Date_2 + (D_1 - D_2) \leq Date_1 \leq Date_2 + (D_1 - D_2)$ is deduced. This new constraint is referred to For each row in the join result, a new RC is computed by merging the old RC with NEW (block 415). The merge produces the smallest interval which contains the old RC and NEW. The values of $C_1$ and $C_2$ in RC are updated accordingly. The result (block 420) is a DDCR of the following form: $(PK=FK) \rightarrow (Date_2 + C_1 \leq Date_1 \leq Date_2 + C_2)$ (block 420).

A very simple example of the operation of this algorithm is illustrated in FIGS. 5 and 6. FIG. 5 illustrates two tables, $T_1$ and $T_2$. Table $T_1$ includes a primary key column and a $Date_1$ column. It will be apparent that table $T_1$ could include many more columns and many more rows. For the sake of simplicity, only two rows and four columns are illustrated.

As can be seen in FIG. 5, the primary key in table $T_1$ can have values 1, 2, 3 or 4. The $Date_1$ column includes date values ranging from Jan. 1, 2000 through Jan. 15, 2000.

The $T_2$ table includes a foreign key column and a $Date_2$ column. The foreign key column is related to the primary key column in $T_1$ by a PK-FK relationship. The $Date_2$ column contains dates ranging from Jan. 20, 2000 through Feb. 5, 2000.

In the first step of the algorithm, tables $T_1$ and $T_2$ are joined with the join condition PK=FK, producing a join result, as illustrated in FIG. 6. The join result includes a $D_1$ column, corresponding to the $Date_1$ column in table $T_1$ and a $D_2$ column corresponding to the $Date_2$ column in table $T_2$. A $D_2 - D_1$ column, which may or may not be part of the join result, shows the difference between $D_2$ and $D_1$.

In the next step of the algorithm, an initial constraint, called the running constraint (RC) is formed. The initial constraint is a null set.

In the next step, the constraint associated with the first row of the join result is analyzed producing a single point 600 at position 19 on a timeline 605. The timeline 605 represents the difference between $D_2$ and $D_1$, as illustrated in the third column of the join result.

In the next step, the constraint for the second row of the joint result is analyzed, producing a single point 610 at position 14 on the timeline 605. The new constraint 610 is then merged with the running constraint, which consists of point 600. The merge creates an interval 615 which includes the old DDC and the new constraint 610. The new DDC extends from 14 to 19 on the timeline 605.

In the next step, the constraint associated with the third row is analyzed to produce a point 620 at position 15 on timeline 605. The new constraint 620 is then merged with the old DDC to produce the new DDC. As can be seen, this merge does not change the DDC because the new constraint, represented by point 620, is already included in the existing DDC.

In the next step, the constraint associated with the fourth row of the join result is analyzed to produce a constraint 625 on the timeline 605. This constraint 625 is merged with the existing DDC 615 to produce a new DDC 630.

Since all the rows in the join result have been analyzed at this point, the DDC 630 is the final DDC. The final values of $C_1$ and $C_2$ are 14 and 21, respectively, and the equation for the final DDCR is $(P_K = F_K) \rightarrow Date_1 + 14 \leq Date_2 \leq Date_1 + 21$.

The above algorithm will always yield a relationship between $Date_1$ and $Date_2$. The relationship may or may not be useful. For example, (L_ORDERKEY=O_ORDERKEY)→(L_SHIPDATE≦O_ORDERDATE+2556) is a useless rule for deriving a range constraint on either L_SHIPDATE or O_ORDERDATE or TPC-H since both of L_SHIPDATE and O_ORDERDATE have the same range of values and both are within seven years (2556 days) of each other. Such rules will not benefit query optimization and will just cause overhead.

To avoid needless imposition of overhead, the "usefulness" of a DDCR is analyzed. Assuming a uniform distribution of $Date_1$ and $Date_2$, a DDCR is most useful when $C_1 - C_2$ is minimized. Since both $C_1$ and $C_2$ were computed from $D_1 - D_2$ in the algorithm described above, the range of values for both is from $(D_1^{MIN} - D_2^{MAX})$ to $(D_1^{MAX} - D_2^{MIN})$, referred to as Low and High, respectively. The usefulness of a DDCR is measured as $(C_1 - C_2)/SIZE$ where SIZE is the interval size for the values of $C_1 - C_2$, which is equal to (High−Low+1). The value of the usefulness function is between 0 and 1 with smaller values implying greater usefulness.

Using the TPC-H workload as an example and the results of the algorithm to be (L_ORDERKEY=O_ORDERKEY) →(122+O_ORDERDATE≧L_SHIPDATE≧O_ORDERDATE+1), then $C_1=122$, $C_2=1$, Low=0.2556 and High=2556. In this case, the usefulness of 0.024. As a heuristic, the optimizer will save and maintain a DDCR only if the usefulness value if it is less than or equal to 0.5. It will be understood that this threshold could be varied without departing from the spirit of what is disclosed herein. Note that the usefulness function can be extended for non-uniform distribution of one or both of the date columns using collected statistics on these columns.

Returning to FIG. 4, once the DDCR is computed, the usefulness of the DDCR is derived (block 425). If the usefulness of the DDCR is less than a threshold, e.g., 0.5, the DDCR is saved and maintained (block 430).

In the algorithm described in FIG. 4, the DDC is a single interval, which may not be the most useful result in some cases. For example, if all line items in the TPC-H case are shipped within 122 days of the order date with the exception of one line item that was shipped after 500 days of its order the interval will be from 1–500, which will be less useful. A more useful result would be a set of non overlapping intervals, for example, from 1–122 and from 500–500. If this non-overlapping constraint is applied to a query that has a range constraint on the order date, the optimizer can define the range of values for the ship date as the union of two small non-overlapping ranges.

Figure 7:
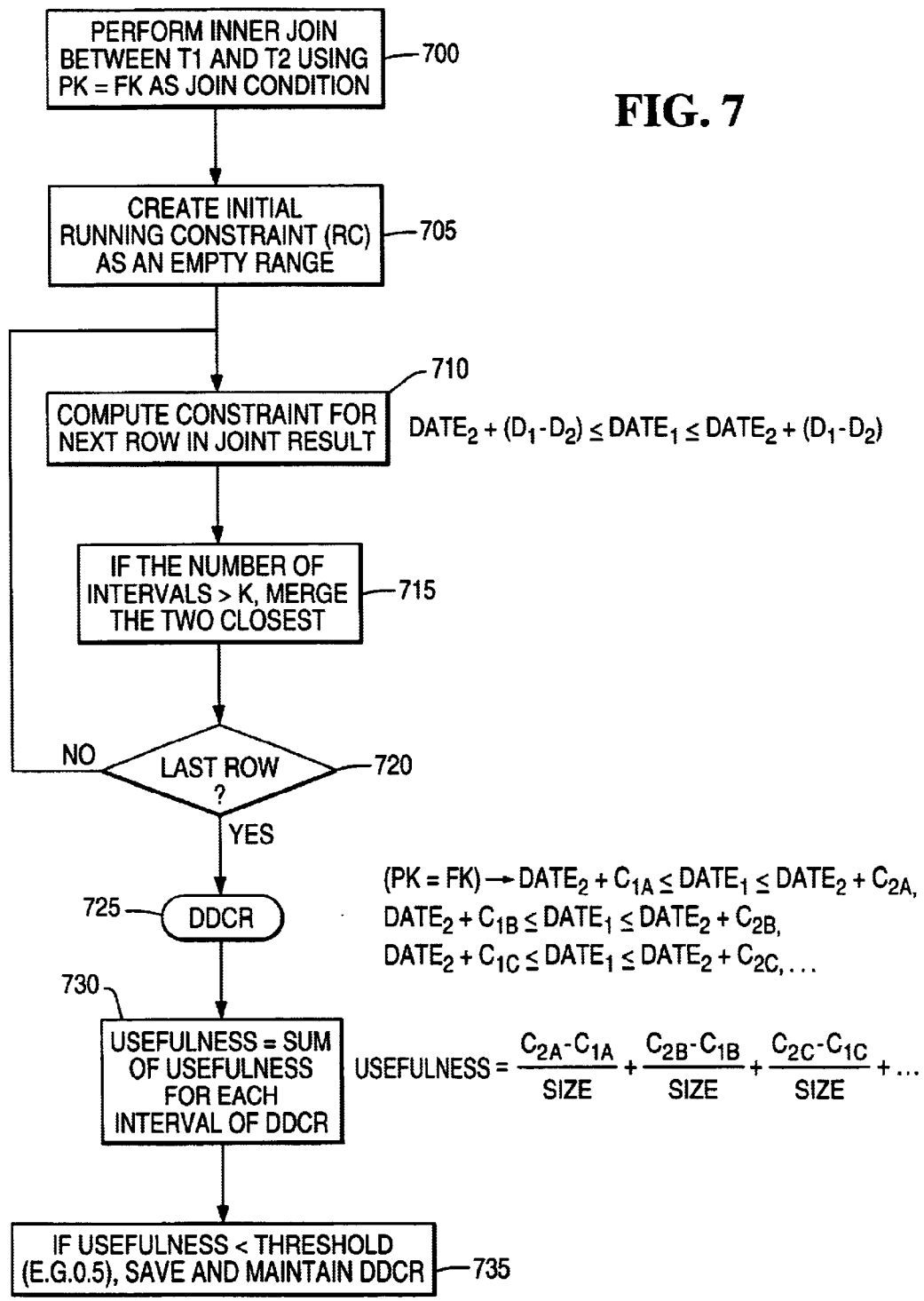
FIG. 7 is a flow chart for an algorithm for deriving and applying a Derived Date Constraint Rule in which a Derived Date Constraint is divided into intervals.

The algorithm is modified as illustrated in FIG. 7 to create non-overlapping intervals for the DDCR. The algorithm allows the number of intervals to increase to a predefined number, K, at which time the two intervals closest to each other are merged to keep the number of intervals below K.

The algorithm begins by performing an inner join between $T_1$ and $T_2$ using PK=FK as the join condition (block 700), as before. An initial running constraint (RC) is then formed (block 705). The constraint for the next row in the join result is then computed (block 710). This constraint will produce an interval which becomes part of the running constraint. In this version of the algorithm, the interval associated with the running constraint is not merged with the interval associated with the constraint just computed. Instead they are left separate.

Figure 8:
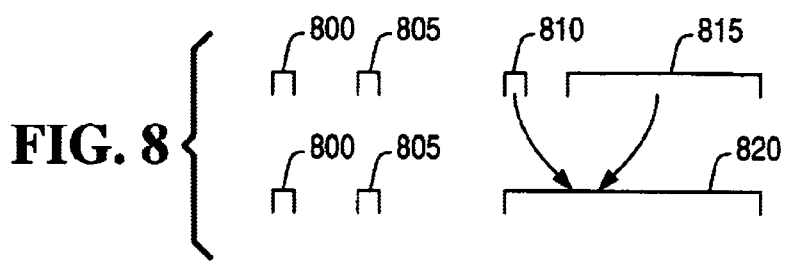
FIG. 8 illustrates merging intervals when the number of intervals exceeds a predetermined number.

In the next step of the algorithm, the number of intervals is compared to the predetermined maximum, K, for the number of allowed intervals. If the number of intervals is greater than K then the two closest intervals are merged. This is illustrated in FIG. 8, in which the running constraint consists of four intervals 800, 805, 810, and 815. In this example, assume K=3, which means that it is necessary to merge the two closest intervals. In FIG. 8, the two closest intervals are intervals 810 and 815. Those two intervals are merged to form interval 820.

It will be understood that merging the two closest intervals is only one approach to reducing the number of intervals. Other approaches that accomplish the same purpose of reducing the overall number of intervals below a predetermined maximum, are also contemplated.

Returning to FIG. 7, if the last row of the join result has not been analyzed (block 720), the algorithm loops back and computes the constraint for the next row in the join result. Otherwise, if the last row has been analyzed, the resulting constraint is the DDC (block 725). In this case, the DDCR will have the form shown below:

$$(PK=FK) \rightarrow DATE_2 + C_{1A} \leq DATE_1 \leq DATE_2 + C_{2A},$$

$$DATE_2 + C_{1B} \leq DATE_1 \leq DATE_2 + C_{2B},$$

$$DATE_2 + C_{1C} \leq DATE_1 \leq DATE_2 + C_{2C}, \ldots$$

The determination of usefulness is modified for this version of the algorithm. In this version, usefulness is analyzed by adding the usefulness of each interval to produce a total (block 730). If usefulness is less than a threshold, e.g., 0.5, the DDCR is saved and maintained (block 735).

The optimizer uses a DDCR, computed under either version of the algorithm, when the left side of the rule exists in a query. To ensure correctness, the optimizer adds the DDC to the largest conjunction that contains the left hand side. The following example illustrates this concept.

Consider the DDCR: (L_ORDERKEY=O_ORDERKEY)→(O_ORDERDATE+122≧L_SHIPDATE and L_SHIPDATE≧O_ORDERDATE+1) and the query condition (L_ORDERKEY=O_ORDERKEY and L_SHIPDATE>'1999-05-01' and L_QTY>100) OR (L_ORDERKEY<>O_ORDERKEY and L_QTY<200). In this case, the optimizer will rewrite the query condition to be (L_ORDERKEY=O_ORDERKEY and L_SHIPDATE>'1999-05-01' and L_QTY≧100 and O_ORDERDATE+122≧L_SHIPDATE and L_SHIPDATE≧O_ORDERDATE+1) OR (L_ORDERKEY<>O_ORDERKEY and L_QTY≦200).

The DDC of DDCR by itself will not provide any benefit to optimizing a query and therefore is redundant. This is because the $DDC_1$ which is a date range between two date columns, will not provide a fast access path to either relation and will not reduce the size of the intermediate result. It will be useful for a query if it helps transitive closure to derive single column date ranges. Consequently, the optimizer uses the following rule to add the DDC of a DDCR: when the left hand of a DDCR is present in some conjunction in the query condition, the DDC is added only if at least one of the date columns is also referenced in that conjunction. The date column will be referenced in a condition of the form "Date op Constant," where op belongs to the set $\{<,=,>,\geq,\leq, \neq\}$.

After the query execution plan is found, the optimizer simply removes all DDCs since they are not useful by themselves.

Figure 9:
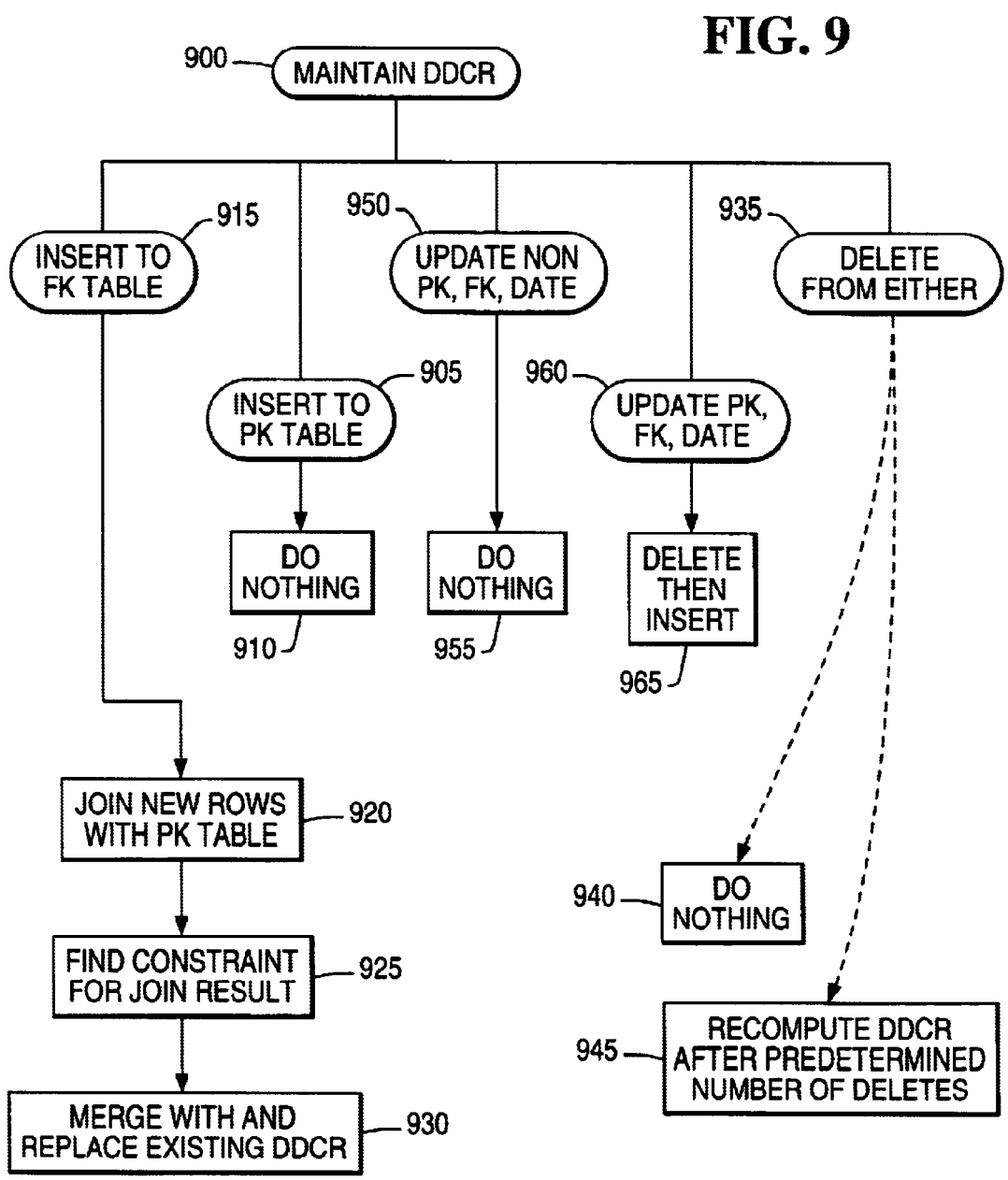
FIG. 9 is a flow chart of a Derived Date Constraint Rule maintenance procedure.

The DDCR must be maintained when changes are made to the tables, as shown in FIG. 9. A maintain DDCR function 900 includes four possible paths. If the operation is an insert to the PK table (block 905), then no maintenance is necessary (block 910). This is because new rows in the PK table will not have any matches in the FK table.

If the operation is an insert to the FK table (block 915), then the new rows in the FK table are joined with the PK table (block 920). The algorithm described above is then applied to the join result (block 925) and the resulting constraint is merged with the existing DDCR and replaces the existing DDCR (block 930).

If the operation is a delete from either of the tables (block 935), the rule maintenance algorithm provides a choice between taking no action (block 940) and re-computing the DDCR after a redetermined number of deletes (block 945). There are multiple options depending on the specific workload. Taking no action would merely reduce the "usefulness" of the DDCR. If the deletes were not frequent, then re-computing the entire DDCR periodically may suffice. In Decision Support Systems ("DSS") and Customer Relationship Management ("CRM") applications, deletes do not occur as frequently as inserts.

If the operation is an update to a column that is not a PK, FK, or the relevant date columns for the DDCR, in either of the tables (block 950), then no action is needed (block 955).

This algorithm has been tested against the TPC-H benchmark with a 10 GB workload. It was found to produce savings in query time ranging from 24% to 89%.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

We claim:

1. A method for optimizing queries to a database, the database comprising a first table (T1) having a primary key (PK) column and a first correlated value column ($CV_1$) and a second table (T2) having a foreign key (FK) column related to the primary key column of the first table and a second correlated value column ($CV_2$), the method comprising joining T1 to the T2 using PK=FK as the join condition to produce a join result having rows, each row including a value from $CV_1$ and a value from $CV_2$;

creating an initial running constraint (RC), the initial running constraint comprising a null range;

producing a derived constraint rule (DCR) having the following form:

$$(PK=FK) \rightarrow CV_2 + C_1 \leq CV_1 \leq CV_2 + C_2$$

where $C_1$ and $C_2$ are constants, and "→" means "implies;" by performing the following processing for each row in the join result computing a new constraint (NEW), having a range; and modifying RC by merging the range of NEW with the range of RC.

2. The method of claim 1 where the join result produced by joining comprises a virtual join result.

3. The method of claim 1 where creating the initial RC comprises applying the following equation:

$$CV_2+C_1 \leq CV_1 \leq CV_2+C_2$$

$$C_1=C_2.$$

4. The method of claim 1 where computing a new constraint comprises solving for $C_1$ and $C_2$ in the following equation:

$$CV_2+C_1 \leq CV_1 \leq CV_2+C_2;$$

where $CV_1$ and $CV_1$ are from the same row in the join result.

5. The method of claim 1 where the range of RC is specified by the following equation:

$$CV_2+C_1 \leq CV_1 \leq CV_2+C_2; \text{ and}$$

modifying RC comprises adjusting C1 and C2 so that the range of the modified RC covers the range of the unmodified RC and the range of NEW.

6. The method of claim 1 further comprising determining the usefulness of the DCR.

7. The method of claim 6 where determining the usefulness of the DCR comprises
comparing the range of the DCR to the range of one of $CV_1$ or $CV_2$.

8. The method of claim 6 where determining the usefulness of the DCR comprises
computing usefulness using the following equation:

$$\text{usefulness} = \frac{C_1 - C_2}{\text{SIZE}}$$

where SIZE is the range of one of $CV_1$ or $CV_2$.

9. The method of claim 6 further comprising
discarding the DCR if its usefulness is greater than a threshold.

10. The method of claim 1 further comprising
maintaining the DCR in view of changes to T1 or T2.

11. The method of claim 10 where maintaining comprises doing nothing if a row is inserted in T1.

12. The method of claim 10 where maintaining comprises doing nothing if a column other than PK, FK, $CV_1$, or $CV_2$ is updated in T1 or T2.

13. The method of claim 10 where maintaining comprises doing nothing if a row is deleted from either T1 or T2.

14. The method of claim 10 where maintaining comprises recomputing the DCR after a predetermined number of rows have been deleted from T1 or T2.

15. The method of claim 10 where maintaining comprises
joining a new row added to T2 with T1;
finding the constraint associated with the new row;
merging the new constraint with the DCR to form a new DCR.

16. The method of claim 1 further comprising
storing the DCR;
applying the right-hand side of the DCR to a query if the left hand side of the DCR is present in a conjunction in the query and at least one of $CV_1$ or $CV_2$ is referenced in the conjunction.

17. The method of claim 1 where $CV_1$ and $CV_2$ are date columns.

18. A method for optimizing queries to a database, the database comprising a first table (T1) having a primary key (PK) column and a first correlated value column ($CV_1$) and a second table (T2) having a foreign key (FK) column related to the primary key column of the first table and a second correlated value column ($CV_2$), the method comprising joining T1 to the T2 using PK=FK as the join condition to produce a join result having rows, each row including a value from $CV_1$ and a value from $CV_2$;
creating an initial running constraint (RC), the initial running constraint comprising a null range;
producing a derived constraint rule (DCR) having the following form:

$$(PK = FK) \rightarrow (CV_2 + C_{1A} \leq CV_1 \leq CV_2 + C_{2A}) \cup$$
$$(CV_2 + C_{1B} \leq CV_1 \leq CV_2 + C_{2B}) \cup$$
$$\ldots$$
$$(CV_2 + C_{1N} \leq CV_1 \leq CV_2 + C_{2N});$$

where $C_{1A}$, $C_{2A}$, $C_{1B}$, $C_{2B}$, ... $C_{1N}$ and $C_{2N}$ are constants, "$\rightarrow$" means "implies," and each parenthesized term on the right-hand side of the above equation represents an interval;
by performing the following processing for each row in the join result computing a new constraint (NEW), having a range; and
modifying RC by forming a union of the range of NEW with the range of RC.

19. The method of claim 18 further comprising
merging two intervals if the number of intervals N exceeds a predetermined maximum number of intervals, K.

20. The method of claim 19 wherein merging two intervals comprises
merging the two intervals that are closest to each other.

21. The method of claim 18 further comprising
computing the usefulness of the DCR using the following equation:

$$\text{usefulness} = \frac{C_{1A} - C_{2A}}{\text{SIZE}} + \frac{C_{1B} - C_{2B}}{\text{SIZE}} + \ldots + \frac{C_{1N} - C_{2N}}{\text{SIZE}}$$

where SIZE is the range of one of $CV_1$ or $CV_2$.

22. A computer program, stored on a tangible storage medium, for use in optimizing queries to a database, the database comprising a first table (T1) having a primary key (PK) column and a first correlated value column ($CV_1$) and a second table (T2) having a foreign key (FK) column related to the primary key column of the first table and a second correlated value column ($CV_2$), the program comprising executable instructions that cause a computer to join T1 to the T2 using PK=FK as the join condition to produce a join result having rows, each row including a value from $CV_1$ and a value from $CV_2$;
create an initial running constraint (RC), the initial running constraint comprising a null range;
produce a derived constraint rule (DCR) having the following form:

$$(PK=FK) \rightarrow CV_2+C_1 \leq CV_1 \leq CV_2+C_2$$

where $C_1$ and $C_2$ are constants, and "$\rightarrow$" means "implies;"
by performing the following processing for each row in the join result compute a new constraint (NEW), having a range; and
modify RC by merging the range of NEW with the range of RC.

* * * * *